(12) United States Patent
Wortelboer

(10) Patent No.: US 8,206,499 B2
(45) Date of Patent: Jun. 26, 2012

(54) STABLE BITUMEN FOAM AND ITS PREPARATION AND USE

(75) Inventor: Johannes Petrus Wortelboer, Anderen (NL)

(73) Assignee: De Veenvoort B.V., Anderen (NL)

( * ) Notice: Subject to any disclaimer, the term of this patent is extended or adjusted under 35 U.S.C. 154(b) by 575 days.

(21) Appl. No.: 12/438,389

(22) PCT Filed: Aug. 22, 2007

(86) PCT No.: PCT/NL2007/050413
§ 371 (c)(1),
(2), (4) Date: Apr. 27, 2009

(87) PCT Pub. No.: WO2008/023982
PCT Pub. Date: Feb. 28, 2008

(65) Prior Publication Data
US 2010/0229757 A1    Sep. 16, 2010

(30) Foreign Application Priority Data

Aug. 23, 2006 (NL) .................................... 2000192

(51) Int. Cl.
*C09D 195/00* (2006.01)
*C08L 95/00* (2006.01)

(52) U.S. Cl. .......... 106/122; 106/273.1; 516/10; 516/12

(58) Field of Classification Search .................. 106/122, 106/273.1; 516/10, 12
See application file for complete search history.

(56) References Cited

U.S. PATENT DOCUMENTS

| | | | | |
|---|---|---|---|---|
| 1,874,209 A | * | 8/1932 | Schnabel | ........................ 261/83 |
| 2,917,395 A | * | 12/1959 | Csanyi | .......................... 106/122 |
| 4,673,614 A | | 6/1987 | Wells et al. | |
| 4,817,358 A | | 4/1989 | Lincoln et al. | |
| 5,788,755 A | * | 8/1998 | Salminen | ................... 106/273.1 |
| 2003/0134036 A1 | | 7/2003 | Hoad | |

FOREIGN PATENT DOCUMENTS

| | | |
|---|---|---|
| GB | 816 254 | 7/1959 |
| GB | 1 237 787 | 6/1971 |
| GB | 1 325 916 | 8/1973 |
| RU | 2 009 710 | 3/1994 |
| WO | 97/19981 | 6/1997 |

OTHER PUBLICATIONS

Traxler, Temperature-Viscosity Data on Asphalt Cements, Texas Transportation Institute, (Sep. 1962).*
International Search Report dated May 6, 2008, from corresponding PCT application.

* cited by examiner

*Primary Examiner* — David M Brunsman
(74) *Attorney, Agent, or Firm* — Young & Thompson

(57) ABSTRACT

A process for the preparation of bitumen foam, wherein a gas is dispersed into the bitumen with a temperature of less than 200° C. and with a viscosity from 100-10,000 mPas measured at the temperature using EN 12596, wherein the process includes bringing the gas tangentially into contact with a bitumen stream, to obtain a bitumen foam that is not dehydrogenated, oxidised or otherwise chemically modified, and in which at least 10 vol % gas is distributed substantially homogeneously. This process can be applied simply and safely, and results in bitumen foam without additions being necessary for this. In this way bitumen can be processed at lower temperatures, even below 100° C., to asphalt or wearing course. The foam bitumen thereby has a half-life time that is much longer than the one of existing bitumen foams

20 Claims, 3 Drawing Sheets

STABLE BITUMEN FOAM AND ITS PREPARATION AND USE

BACKGROUND TO THE INVENTION

Figure 1A:
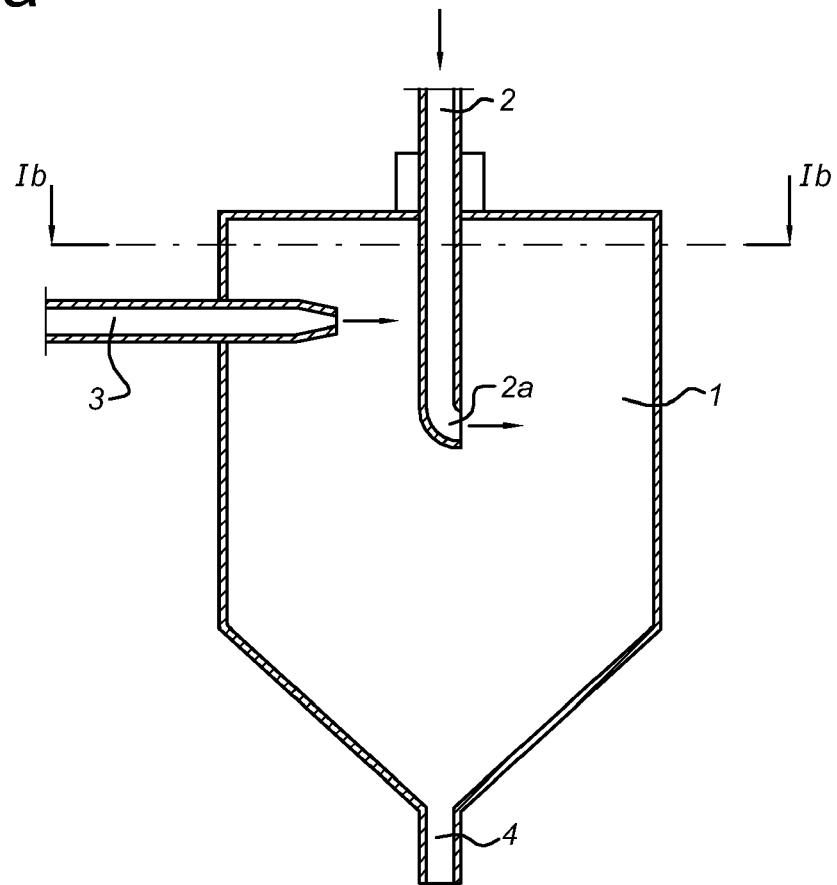

The invention pertains to stable bitumen foam and an process for preparing such bitumen foam. The invention also pertains to the use of this bitumen foam in civil engineering and the manufacturing of roof-covering.

In the sixties it was discovered that mixing bitumen and crushed stone can be improved by converting the bitumen into foam with a lower viscosity. In order to manufacture this so-called foam bitumen, Csanyi proposed in U.S. Pat. No. 2,917,395 to inject steam under a super-atmospheric pressure typically of about 3.4-6.1 atm. in a mixing chamber with bitumen, and pump out the mixture of steam and bitumen through a pipe with specific dimensions, for example at a lower pressure of 1.4-5.4 atm. This way, bitumen is produced which increases at least 10, but in general 15-20, and sometimes even 50 times in volume. However, this method seemed primitive because the quality of the foam bitumen was not consistent and it was impossible to realise a ratio of foam: bitumen of more than 4:1.

This process was improved by Mobil Oil Corporation, as described in the patent publication GB-1,325,916 from 1973. The improvement consisted of substituting steam for water, so that it was cheaper and easier to manufacture the mix. By thoroughly mixing water and bitumen at a pressure higher than the atmospheric pressure and then bringing the mixture to a lower pressure, preferably atmospheric pressure, the rapid evaporation of the water ensures consistent foaming and the degree of foaming can be regulated by the pressure difference.

Since that time, foam bitumen has always been manufactured by bringing water in contact with hot bitumen. In US 2003/0134036 an operating procedure is described that uses foamed bitumen to coat stones in an asphalt installation, using a cascade system according to the conventional "Csanyi" method.

The disadvantage of this technique is that foaming is largely determined by the water pressure, of which the vapour pressure decreases the moment the bitumen cools off to below the 100° C. and the water condenses. Thus such foam has only a limited standing time left and a very limited temperature limit. Therefore, when this foam bitumen is used as an alternative for "untreated bitumen," for example to manufacture asphalt or for wearing courses (due to the favourable viscosity lowering effect of foamed bitumen), it should still be done at relatively high temperatures. After the application of the foam bitumen there is also only a limited possibility to include crushed stone into this before the layer slumps. Once it has slumped, a homogenous division of the crushed stone does not occur, and the asphalt or wearing course has an inferior quality. Furthermore, the water can afterwards have a negative effect on the characteristics of the asphalt. The danger of stripping, whereby the bitumen or crushed stone becomes undone, is thus not inconceivable. Water, due to its polar structure, gives a better "moistening" of polar concrete surfaces (such as applied during the preparation of asphalt) than non-polar binding agents, including bitumen.

Furthermore in GB-816,254, published in 1959, a method was described to obtain foam bitumen using a blowing medium, for example to bring carbonate salt into softened bitumen and raise the temperature higher than the decomposition temperature of the blowing medium, but whereby the temperature is indeed maintained sufficiently low as to prevent the occurring gas, for example $CO_2$, from escaping. It typically deals with a temperature of 100-180° C., and after approximately 2 hours results in a product with a bulk density of 0.2-0.25 g/cm³. However, such a method contains chemicals that are relatively expensive to be applied on a large scale in the bitumen industry.

In U.S. Pat. No. 4,817,358 mention is made of the preparation, or preparation in batches of a thin, foamed asphalt layer by applying a high shear mixer. The asphalt temperature is between 250 and 450° F. (120 and 230° C.). As mentioned therein, stable foam can only be obtained with very thin layers, so thin that they cool off rapidly, so that the rest of the foam structure is "frozen." In U.S. Pat. No. 4,673,614 a similar form of construction is also discussed, whereby hot asphalt is brought in. Due to the lack of further specifications it is plausible that here it deals with the same high temperatures. In practice, thin layers with these techniques mean approximately 0.5 mm, whereby they—and then even in a limited way—can only be used for a specific type of roof-covering (such as shingles). With higher thicknesses, stability is impossible. Moreover, the batch process proposed in there are not profitable, especially not with road building, where large surfaces are worked on.

The so-called air-blown bitumen also exists in the field. This designation deals mostly with the manner of preparation. Blowing bitumen is a process that is at least as old as the above-described preparations of foam bitumen. For example GB-1,237,787 describes such a process, whereby an oxygen-containing gas is blown through bitumen at a temperature high enough to dehydrogenate the bitumen under the influence of oxygen. The temperature of the bitumen is approximately 270° C., and the gas is being blown in at a minimum of 170° C. The blowing conditions are adjusted as such that a froth flow of small air bells occurs, preferably as small as possible, in order thus to optimize the contact surface between the reactants oxygen and bitumen.

It is also possible to increase the process of dehydrogenation by using catalytic agents such as described in WO-A-97/19981. In this case phosphoric acid is applied, and due to this it may already be possible to obtain a chemical change at a temperature of 190° C. and a length of time of at least 1 hour. Besides, the lowest temperature in the practical examples is still 200° C. It is also described here that a combination of bitumen and a thermoplastic rubber can be used as a base; the objective here each time is to obtain a chemical change due to polymerization.

Often even antifoam additives are added here, but in as far as foaming occurs in this process, it deals with instable foam that disappears almost instantaneously after blowing. The formulation of the problem here is completely different from the one during the manufacture of bitumen foam: due to the blowing of the bitumen (leading through of oxygen) the softening point of the bitumen is increased and penetration lowered, without this occurring at the expense of its water resistance and durability.

As for the prior art, the need for stable bitumen foam and a cost-effective, easy, and safe method to prepare bitumen foam still exists. In civil engineering for example the need also exists for a substance that is easier to process into asphalt and wearing courses without the need for high temperatures, and which allows sufficient time to divide crushed stone homogeneously.

DESCRIPTION OF THE INVENTION

It is an objective of the invention to provide a process for manufacturing simpler bitumen foam wherein, among other things, the disadvantages of the use of water and steam during the process are removed. Is also an objective of the invention to manufacture bitumen foam that can be applied more easily in civil engineering, in particular that can be processed at lower temperatures to asphalt or a wearing course and of which the slumping time is not too rapid, such that the crushed stone can be divided homogeneously across the layer. It is furthermore an objective of the invention to manufacture bitumen foam, which is so stable it can be applied in thick layers as well.

It has currently been found that the disadvantages of the existing operating procedures for the preparation of foam bitumen can be cancelled out, instead of using water and steam, by dispersing a gas with low air humidity, especially air, into the bitumen without having to use large pressure differences here. Because of this, it is easier and safer to apply this method without thereby needing additional ingredients. It is nowadays possible to obtain foaming in bitumen without changing the bitumen composition.

In a first aspect the invention thus pertains to a process for the preparation of bitumen foam, wherein a gas is dispersed into bitumen with a temperature of less than 200° C., preferably at a temperature of less than 190° C., even more preferably at a temperature of less than 180° C., specifically less than 140° C., and with a viscosity of 100-10.000 mPas measured at this temperature using EN 12596, as to obtain bitumen foam in which at least 10 vol % of the gas is distributed substantially homogeneously.

In the framework of the invention, the viscosity of the continuous phase, the bitumen, can be adjusted, with the temperature as a variable, provided that the temperature of the bitumen does not exceed the aforementioned threshold, and thus remains sufficiently low to prevent reactions of the bitumen components to the blown bitumen. Likewise, it should be prevented that linking- or polymerization reactions occur between bitumen and any added substances such as (thermoplastic) rubbers or other added polymers. The process for the preparation of bitumen foam excludes steps whereby there is dehydrogenation, oxidation, or otherwise chemical modification.

For practical reasons, the temperature of the bitumen during preparation is at least the same as the temperature of the gas to be dispersed. However, the process in itself is not limited to a temperature lower boundary: bitumen can even be used at a low temperature suitable for the process, provided that the bitumen complies with the viscosity criteria. In practice, the lower boundary is limited to the ambient temperature. If any, surface active substances (such as emulsifiers) can be applied to the foaming process to improve the dispersion of gas into the bitumen.

With "substantially homogenous" is meant that the gas is divided up or distributed evenly as small to very small bells throughout the whole bitumen, whereby the gas bell size distribution throughout the bitumen is identical. The average gas bell size is typically less than 500 μm, preferably less than 20 μm. It is hereby not necessary to have a homogeneous gas bell size; it is important that across the bitumen the same degree of foaming is visible.

From the point of view of expenses, air is preferably used as the gas. For the foaming process it is not harmful if the gas is an oxygen-containing gas because at these relatively low temperatures no undesirable hydrogenating reaction occurs. The gas is characterized by a relative dampness that is lower than 90%. Thus the process cannot be confused with the process known in the prior art as steam injection. A moisture content that is too high adversely ensures that the bitumen foam would be "contaminated" by water, which negatively influences the stability of the formed foam and durability of the asphalt.

The temperature of the gas to be dispersed shall not be selected too low in order to prevent that the bitumen cools down too rapidly during foam forming. In principle, gas can be used at room temperature, but better results are attainable if the gas that is brought into contact with the bitumen preferably has a temperature that is higher than 50° C.

According to the process of the present invention immediately prior to the contact with the gas, the bitumen has a viscosity of between 100 and 10.000 mPas, preferably between 200 and 5000 mPas. The actual viscosity can be adjusted using the temperature of the bitumen. Thereby it obviously is preferable to select the temperature of the bitumen as low as possible to safe energy expenses. The temperature of the bitumen is selected as such that the viscosity is low enough to process the bitumen, specifically the ability to pump and mix it with gas, but sufficiently high that the gas indeed remains enclosed within the bitumen.

Besides that, the viscosity- and temperature dependability thereof are also determined to a large degree by the origin and type of the bitumen.

There is no restriction as to the type of bitumen to be used.

Any type of bitumen that is foamed according to conventional techniques can also be applied to the process of the invention. In practice the bitumen preferably has a penetration value of 40-200 dmm prior to foaming, such as determined according to ASTM D 5 at 25° C.

Other than due to a change in the temperature, the viscosity of the bitumen can also be influenced by adding oil with a vegetable origin or mineral oil to it, such as for example rapeseed- or sunflower oil, or fatty acid monoesters as described in EP-A-900.822. Such agents and the amounts needed are known to the skilled person. The viscosity restriction is thus in force for the bitumen in connection with viscosity reducers or -elevators and other ingredients and at the temperature whereby the bitumen is brought into contact with the gas.

The process preferably does not contain ingredients that can be used as a catalytic agent in dehydrogenating (also called: "bitumen blowing catalysts") or considered as a combination, such as iron(III) chloride, phosphoric pentoxide, aluminium chloride, boric- and phosphoric acid.

The gas is preferably supplied to the bitumen using an overpressure of 0-20 bar, preferable an overpressure of 0.5-10 bar.

The foam bitumen is formed immediately; the period of time when the bitumen and gas to be dispersed are brought into contact with each other is less than 1 minute; the contact time is preferably less than 1 second, typically in the order of milliseconds. The method of dispersing the gas into the bitumen can take place in different ways.

In one embodiment the dispersing step encompasses injecting gas into a bitumen stream, the same way as described in the prior art for foaming bitumen with steam or water. With the velocity of the bitumen stream, gas insertion can be regulated. Hereby the gas intake can be located in as well as upstream from the pumping unit that regulates the bitumen stream.

In another embodiment the dispersion step encompasses subjecting the bitumen to shearing forces, such that gas from the environment is fed into the bitumen by vortex. By regulating this shearing in a closable mixing chamber the gas temperature and—composition can further be regulated, if desired.

The shearing preferably involves a large rotational flow or vortex-component. The precise adjustment of the pressure, shearing forces during mixing and the vortex (and with that the gas stream) are dependent on the stability of the bitumen foam aimed at, and it belongs to the normal work of the skilled person to determine this. Anyhow, the pressure differences used are much lower than in the prior art for manufacturing foam bitumen.

The shearing can be achieved by bringing the gas into the bitumen using existing high-shear mixers, emulsifying- or dispersing mixers. It has been found that mixing can now take place at bitumen temperatures of even less than 120° C. However, a preferred embodiment is schematically represented in the FIGS. 1 and 2.

These figures are meant as an illustration and do not limit the theory of the invention. The skilled person is supposed to be able to make adjustments in there without abandoning the idea of the invention.

In this embodiment contact is made between the gas and bitumen to be dispersed by bringing the gas 3 tangentially into contact with a bitumen stream 2. This preferably takes place in a substantially cylindrical or conical, preferably substantially closable, mixing chamber 1 where the gas, in the form of a gas stream is brought into the vicinity of the bitumen stream, preferably by injection. The mixed bitumen stream leaves the mixing chamber in foamed state.

This embodiment makes it possible to work at energetically favourable low temperatures as well as to better control the gas bell distribution—and with it the stability—in the final bitumen foam, and thicker, stable bitumen foam layers are thus achievable. In contrast to the preceding embodiments, hereby no mechanical work has to be performed. Moreover, this method can be performed continuously, whereas for example the afore-described high-shear mixing as batch process cannot be scaled up and is unsuitable for numerous applications, especially road construction.

Figure 1B:
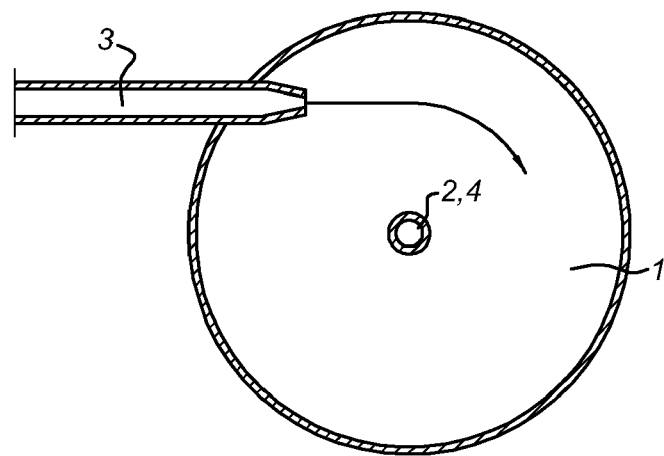

FIG. 1A schematically displays this embodiment, and FIG. 1B schematically displays a cross-section A-A' of the set up of FIG. 1A.

Like it becomes clear from FIG. 1B, a tangential stream is realised by bringing in the gas stream asymmetrically from the centre. Thereby is also important the substantially cylindrical form of the mixing chamber. A so-called "spray-nozzle" or "slot-nozzle" is preferably used, even more preferably a spray-nozzle. Within this well-known category it is preferable to use a "swirl nozzle" or tangential nozzle.

Figure 2:
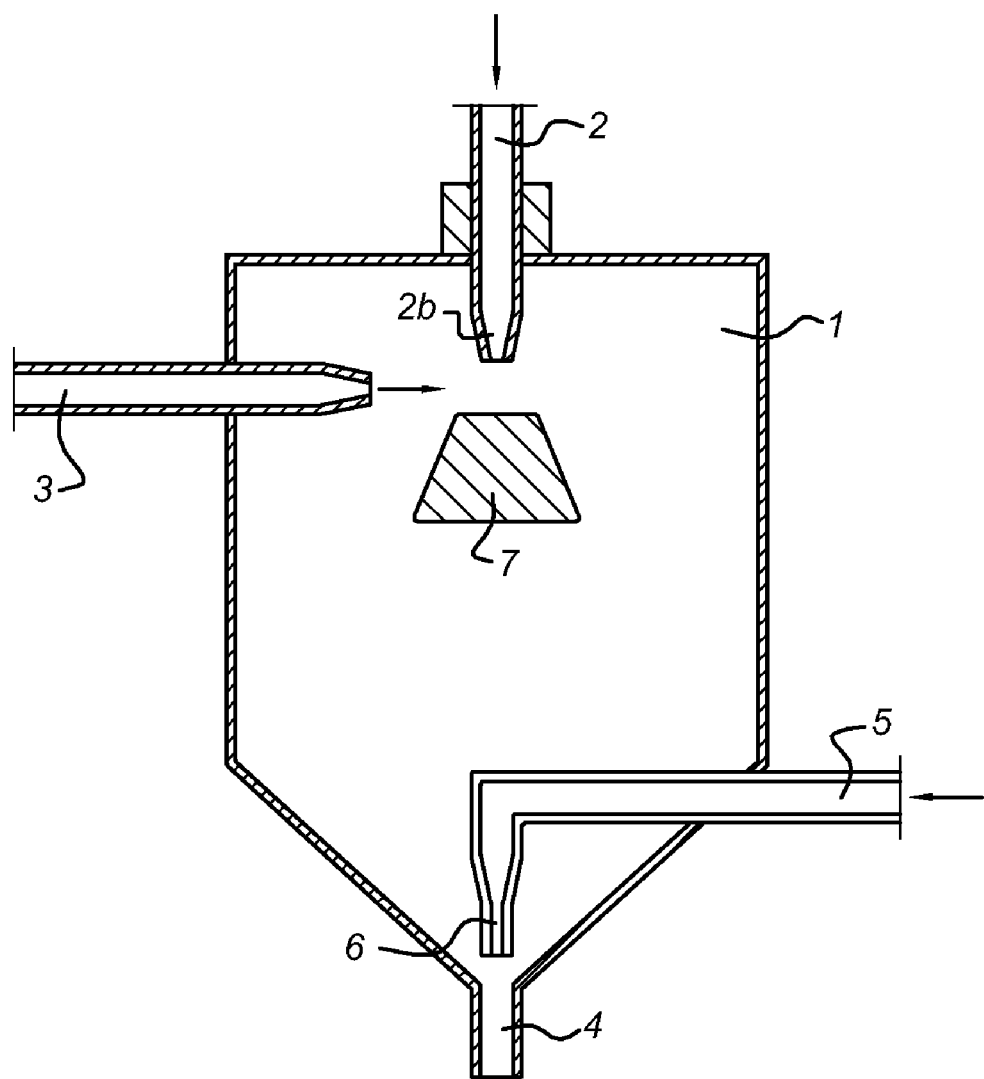

The bitumen stream can be brought into the mixing chamber via an inlet tube starting from the top. A tube with open ends can be used. If desired the distribution of gas into the bitumen stream can be stimulated by not letting the bitumen stream straight down (2*b*) but through a sideways opening 2*a*. These options are represented in FIG. 2 and FIG. 1A respectively.

Preferably further downstream a second gas stream 5 is brought into contact via the to the skilled person known, "Venturi" effect with the bitumen stream. The Venturi effect is the name given to the physical phenomenon whereby gas particles accelerate when their circulation zone is reduced, an example of the Bernoulli principle. A possibility to realise this is represented in FIG. 2 (number 6). Hereby a pressure drop occurs due to the narrowing of the supply of the second gas stream. Another, not drawn variant is the use of a so-called plate with a small opening in the centre that closes off the second gas stream in the mixing chamber, indicated as the "orifice plate." With the size of the opening and constriction, the combined action of pressure and speed of discharge (according to Bernoulli) can be adjusted. With this second gas stream the gas bell size can be regulated, in particular reduced. Smaller gas bells may be desirable to obtain more stability. The inlet opening is preferably formed by a nozzle, more preferably a slot-nozzle or spray-nozzle. In this case, the end of the second gas stream is preferably at the centre of the mixing chamber, more preferably directed towards the vicinity of inlet 4 of the mixing chamber. This preferred embodiment is presented in FIG. 2.

Both gas streams are brought in independently of each other with an overpressure of 0.1-20 bars; preferably 0.5-10 bars, measured at the start of the gas stream, in the feed pipe or feed pipes. Such as mentioned above, the gas in both cases is preferably air.

The mixing chamber is preferably closable, for a better regulation of the pressure- and temperature conditions. It is preferable to apply a mixing chamber in a substantially cylindrical or conical form.

If the mixture of bitumen and gas leaves the orifice, expansion of the gas follows and the desired foam occurs. By tuning the pressure of the gas and bitumen to each other, the desired foam structure occurs.

The stream velocities of the bitumen stream, first gas stream and optional second gas stream are also adjustment parameters. It is preferred that the foamed bitumen stream that leaves the mixing chamber is 40-100 kg per minute. The first gas stream is preferably 30-70 vol % of the incoming bitumen stream (prior to contact with the gas stream), and a possible second gas stream is approximately 20-50 vol % of the bitumen stream, prior to contact with the first gas stream.

Further inspection can be realised by guiding the bitumen stream after the first contact with the gas across a distribution unit 7, for example via a conically-formed plate with grooves and/or blades so that the liquid stream is forced in a preferential direction. This is represented in FIG. 2. Additionally or independently thereof the absorption of gas bells from the first gas stream in the bitumen stream can be stimulated by bringing in the bitumen stream at an angle. A way to achieve this is shown in FIG. 1.

If desired, it is possible to exchange the different options within the embodiments as shown in the FIGS. 1 and 2.

The invention further pertains to an apparatus or device for manufacturing foam bitumen according to the invention. An embodiment of this apparatus is schematically represented in FIG. 1A. The apparatus contains a closable mixing chamber 1. The mixing chamber 1 contains a first inlet 2, a second inlet 3, and an outlet 4. The mixing chamber is preferably substantially conical or cylindrical in form and closed on both sides, with the exception of inlet 2 and outlet 4.

The first inlet 2, which is placed at the first end of the mixing chamber 1, is set up to bring a bitumen stream into the mixing chamber 1. Preferably the first inlet 2 is set up centrally into the first end of the mixing chamber 1 in the manner represented schematically in FIG. 1B.

The second inlet 3 is set up for bringing a first gas stream into the mixing chamber 1. The second inlet 3 is thereby placed as such that a tangible gas stream is obtained. Such as schematically represented in FIG. 1B, which shows a cross-section of the mixing chamber 1 alongside line A-A' in FIG. 1A; this can be achieved by not directing the first gas stream originating from the second inlet 3 towards the centre but leading it alongside the wall of the mixing chamber 1.

The outlet 4 is set up for the discharge of the product obtained in the mixing chamber. Preferably the outlet 4 is placed at the second end of the mixing chamber 1.

FIG. 2 shows schematically another embodiment of an apparatus or device for manufacturing foam bitumen according to the invention. In this embodiment the mixing chamber 1 contains besides the first inlet 2, the second inlet 3 and outlet 4 a third inlet 5. The third inlet is set up for bringing a second gas stream into the mixing chamber 1. The third inlet 5 is placed downstream of the second inlet 3. The third inlet 5 is set up as such that the second gas stream is brought in by making use of the Venturi effect in the mixing chamber 1. For this, the third inlet 5 can be provided with a Venturi tube 6 or an "orifice-plate" construction. The inlet 5 is preferably placed as such in the mixing chamber 1 that the end of the inlet 5, from which the second gas stream is brought into the mixing chamber 1, is located in one line with the end of the first inlet 2 from which the bitumen stream is brought into the mixing chamber 1.

For example, in the embodiment of the apparatus, e.g. the embodiment shown in FIG. 2, the apparatus can further contain a division unit 7. The division unit 7 is placed as such that it can divide the bitumen stream originating from first inlet 2. Besides that, the distribution unit is placed downstream of the second inlet 3. The distribution unit 7 can be a conically-formed plate that can be provided with grooves and/or blades.

The end of the first inlet 2 of which, during use, the bitumen stream flows into the mixing chamber 1 can be bend as such that the bitumen stream and the first gas stream originating from the second inlet 3 in principle are brought into the same plane of the mixing chamber 1.

In embodiments of the apparatus the ends of the second inlet 3 and/or third inlet 5 can be outfitted with a nozzle, preferably a spray- or slot nozzle. The possible nozzles at the ends of the inlets 3 and 5 are not shown in the figures.

The apparatus can further contain one of the above-discussed characteristics.

With the formed "foam bitumen" is meant an non-dehydrogenated, non-oxidised and non-chemically modified foam bitumen, not to be confused with blown bitumen such as that obtained using oxygen and possible catalysers at high temperatures.

The bitumen foam has a volume increase that lies preferably between 20 and 100% in relation to the non-foamed bitumen. The volume ratio of the dispersed gas and the continuous phase in the bitumen foam thus lies preferably between 1:1 and 1:5. The ratio between the dosed gas amount and bitumen stream also determines the stability and consistency of the obtained foam. In order to achieve the desired stability (half-life time) of the foam, agents such as fluoropolymers, perfluorocompounds and stearates, such as perfluoroalkyl stearate, polyperfluoroether stearates are preferably applied.

The bitumen foam that leaves the mixing stage preferably has a temperature that makes the bitumen foam immediately applicable for further processing, namely mixing with mineral ingredients as fillers, sand and stone. Even at a temperature of lower than 100° C. the bitumen foam can be formed or cooled down without loss of stability, while foam bitumen prepared with water or steam at a lower temperature level can no longer be processed.

Although the bitumen foam prepared according to the present invention is sufficiently stable after preparation, before or during the foaming of the bitumen surface active substances can be supplied to the mixture of air and bitumen in order to further stabilise the foam and delay the breaking down of the foam over longer periods or time, at least much longer than the processing time. Nanoparticles often also contribute to a stable boundary surface. The surface active substances can be added prior to or at the same time the gas comes into contact with the bitumen. Preferably the bitumen already has an increased temperature during the mixing with the surface active substances, in order to improve mixing. Although the use of surface active substances for stability improvement in itself is known from the prior art, the usual surface-active substances there do not have any effect in the invention. After all, water has a hydrophilic nature, whereas the air used in the process of the invention is only hydrophobic. Thus the boundary surface to be stabilised is different in nature. Surface-active substances that are at work in a hydrophobic environment are preferable, especially perfluoroalkyl compounds. Examples of this are fluoride polymers, perfluoroalkyl stearates, polyperfluoroether stearate.

It is also an objective of the invention to provide bitumen foam whereby the problem of instability or breaking down is reduced, and that also below 100° C. is stable and whereby the bitumen composition does not need to be changed.

Figure 3:
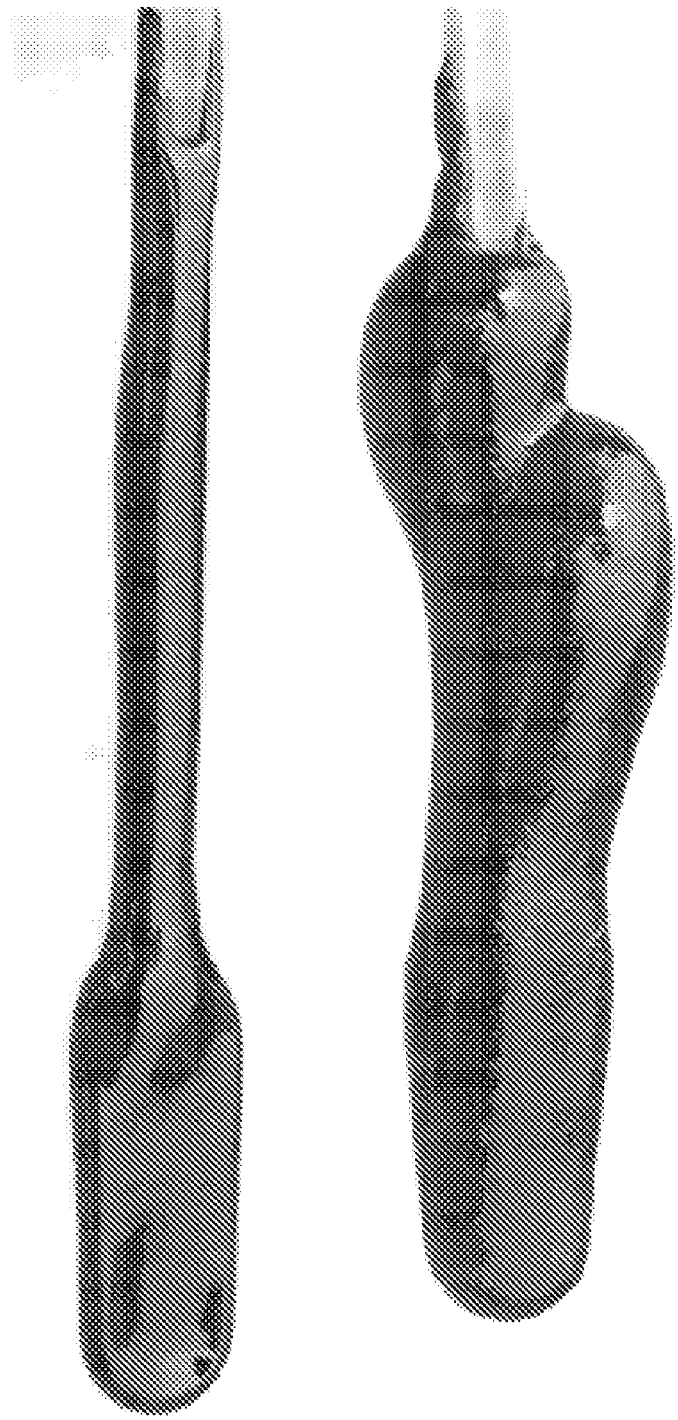

The special aspect of the invention is clarified in FIG. 3. In here a bitumen foamed according to the invention (right) is compared to a bitumen (left) foamed using steam. The photograph was taken after cooling down the foamed bitumen slowly to an ambient temperature of 20° C. For the sake of completeness it is mentioned that foamed bitumen prepared with the high-shear mixer in the batch process according to U.S. Pat. Nos. 4,817,358 and 4,673,614, after less than 10 seconds also corresponds to the collapsed foam as shown on the left. This is not represented separately. From this it becomes apparent, as already described in the publications themselves, that this material is not suitable for manufacturing thick layers.

The invention therefore also pertains to bitumen foam obtainable according to the aforementioned process of the invention, wherein the bitumen foam is stable at a temperature that is lower than 100° C., preferably even at a temperature of 50° C. A measure for the stability is the half-life time of the foam: the time needed for the foam to, under conditioned circumstances, lose half of the initial volume. In determining the half-life the point where the foamed bitumen is at its highest volume increase is taken as the initial point in time. During the comparison of the half-life times for different foamed bitumen it is thereby important keep the temperature constant.

Foams known in the prior art to be manufactured with water exhibit half-life times of approximately 1 minute, usually even less, provided that it is measured at a temperature of more than 100° C. With the process according to the invention the half-life time of the bitumen foam is at least a factor five higher than that of foam prepared traditionally, by steam- or water injection, starting from the same bitumen. When the half-life time at a temperature is determined below 100° C., for example 80° C., the distinction is even stronger: to an important degree bitumen foam according to the invention still has the same half-life time, whereas traditionally prepared bitumen foam has already collapsed and is no longer useable.

The half-life time of the bitumen foam at 80° C. is at least 10 minutes, preferably more than 30 minutes, under constant circumstances. Because the foam has a better stability as compared to the conventional foam bitumen, the processing time is longer which is advantageous for a number of applications.

However, the half-life time is preferably indeed finite, so that this makes further processing possible. After all, in the manufacturing of wearing course, breaking down after absorption of the crushed stone, is even necessary. The bitumen foam according to the invention preferably has a half-life time at 80° C. of a maximum of a couple of hours, preferably less than 2 hours.

Besides the extended slumping (of collapsing) time the bitumen foam, according to the invention, also has the advantage that it does not need to contain other components except bitumen (and gas), and for example no water such as foam bitumen prepared according to conventional water- and steam methods.

The invention further also pertains to the use of the bitumen foam according to the invention in civil engineering (roads and dikes), in particular for manufacturing asphalt or wearing course. Due to the lower viscosity in connection with the extended half-life time the present foam has a number of advantages over non-foamed bitumen or foam bitumen prepared according to conventional methods (with water/steam). Therein, the invention particular pertains to a process for the manufacturing of asphalt and/or wearing course, wherein a bitumen foam according to the invention can be applied at a temperature of below 120° C., preferably below 100° C., and most preferably even below 80° C. to a lower layer, after which the crushed stone is applied in here, before the breaking down of the bitumen foam layer. Further details of this process are part of the skilled person's knowledge and do not form part of the invention.

Although the temperature in principle is not a restriction in the manufacture of asphalt/wearing course, and bitumen foam can also be applied at a higher temperature, for safety reasons and from an energy consumption point of view it is preferred to keep the temperature as low as possible. It is thereby even possible to work below 100° C., with which the process of the invention clearly distinguishes itself from asphalt- or wearing course manufacturing whereby conventional foam bitumen is used. For that a temperature of more than 150° C. and even a lot higher than that is necessary. Otherwise foaming does not occur, or at least the layer breaks down immediately after applying the lower layer. For wearing courses it is advantageous to apply the bitumen foam according to the invention with a layer thickness of 1 mm or more.

It can also be elected to make the bitumen foam so voluminous that the chipping material, for example crushed stone, applied later disappears completely into the bitumen layer. By correctly selecting the moment of compacting, preferably by rolling, a surface is obtained whereby the topside contains bitumen (this is known in the UK as "black-top").

The bitumen foam can also be applied in dike construction or roof protection.

The bitumen foam is in particular suitable for applying roof-covering layers of stable foam of at least 3 mm in particular of more than 4 mm. Layers of 5 mm are customary. The process according to the invention makes it possible to manufacture foam that is stable even across these thicknesses.

The principle according to the invention can also be used for the foaming of organic thermoplastics, among which "hot melt," among which resin and wax, and with that to realise viscosity reduction, a combination with these materials or not with bitumen. Such organic thermoplastics are characterised by a relatively viscose nature if melted, due to which these materials generally are difficult to apply. By foaming these materials such as described above, these problems can be overcome and are more easily processable. Materials in this category are for example montaan wax, carnauba wax, atactic polypropene, paraffins, polyester resins. It is characteristic for these materials that the viscosity decreases so much during the temperature increase that a liquid is provided with a viscosity range as described in here, i.e. organic thermoplastics with a viscosity that at a temperature of less than 200° C. ranges between 100 and 10.000 mPas. Obviously, when combinations of these materials are applied or mixtures of these materials with bitumen, the viscosity criteria apply to the whole mixture.

The bitumen according to the present invention can also be mixed with thermoplastics and/or thermoplastic elastomeric such as SBS. Within the field these bitumen that are mixed with thermoplastics and elastomerics are also indicated as polymer-modified bitumen or PMB. Such materials are often added to prevent distortion during the application of the bitumen in asphalt and wearing courses, especially when the end products are overloaded, for example busy roads.

If these organic thermoplastics are applied in combination with bitumen, it is preferable that the bitumen and organic thermoplastic or thermoplastics and/or elastomerics are mixed to an important degree prior to the dispersing step. The optimum circumstances and mixing amounts are known from the prior art. The volume increase of the expanded bitumen foam that also contains organic thermoplastic or thermoplastics and/or elastomerics is then preferably between 20 and 100% in relation to the non-foamed mixture of bitumen and organic thermoplastic or thermoplastics.

The bitumen foam according to the invention can be used for numerous applications, for example in the preparation of asphalt, in particular for building roads. Due to the stability of the bitumen foam it is in principle even possible to prepare the foam at another location, although this often is logistically not preferable due to the volume increase. However there are numerous applications thinkable where due to this reason the improved stability is indeed advantageous.

EXAMPLE 1

Bitumen (type Venezuelan; penetration value 150-200 dmm) with a viscosity of 30.000 mPas (measured at 60° C. according to EN 12596), to which 0.05% of a polyperfluoroether stearate surfactant (Fluor N 2592, Cytonics, Beltsville, Md., USA) was added, was subjected to shearing forces at approx. 8.000 rpm in a high-shear mixer (brand Kinematica) at a temperature of 110° C., so that a vortex was provided. The viscosity associated with this temperature, also measured according to EN 12596, was approximately 3200 mPas. As a consequence of the high shearing forces air was dispersed into the bitumen as fine gas bells.

After a period of 30-60 seconds bitumen foam was obtained with a volume increase of 27% as compared to the original bitumen brought into the mixing chamber.

The bitumen foam had a half-life time according to ASTM D 5 at 25° C. of 150 minutes during the natural cooling down process.

EXAMPLE 2

Bitumen (type Venezuelan; penetration value 150-200 dmm) with a viscosity of 30.000 mPas (measured at 60° C. according to EN 12596), to which 0.05% of a polyperfluoroether stearate surfactant (Fluor N 2592, Cytonics, Beltsville, Md., USA) was added, was brought into a conical mixing chamber with a velocity of 60 kg per minute, a pressure of 2 atmosphere and a temperature of 110° C. whereby the opening of the supply pipe was located on the bottom. The viscosity associated with this temperature, also measured according to EN 12596, was approximately 3200 mPas.

A first air stream was brought into the mixing chamber (ambient temperature, 2 bar and approx. 20 liter per minute) tangentially using a spray nozzle.

Further downstream a second air stream was introduced using a Venturi-tube with a speed of approx 50 liter per minute via slot nozzle.

Immediately after the outflow bitumen foam was obtained with a volume increase of 30% as compared to the original bitumen that was brought into the mixing chamber.

The bitumen foam according to ASTM D 5 had a half-life time at 25° C. of 8 minutes during the natural cooling down process.

The invention claimed is:

1. A process for the preparation of bitumen foam, comprising:
   dispersing a first gas stream into bitumen, the bitumen having a temperature of less than 200° C. and a viscosity of 100-10,000 mPas measured at said temperature of less than 200° C. using EN 12596,
   wherein the gas is brought tangentially into contact with a bitumen stream, and for a contact time of less than 1 minute; and
   obtaining a bitumen foam that is not dehydrogenated, oxidized or otherwise chemically modified, and in which at least 10 vol % of the gas is distributed substantially homogeneously.

2. The process according to claim 1, further comprising bringing a second gas stream downstream into contact with the bitumen stream using a Venturi-effect.

3. The process according to claim 2, wherein the first gas stream is 30-70 vol % of the bitumen stream, prior to contact with the first gas stream, and the second gas stream is 20-50 vol % of the bitumen stream, prior to contact with the first gas stream.

4. The process according to claim 1, wherein said temperature of less than 200° C. is less than 180° C.

5. The process according to claim 1, wherein said gas is air.

6. The process according to claim 1, wherein the gas is brought into contact with the bitumen stream in a substantially cylindrical or conical mixing chamber.

7. The process according to claim 1, wherein said bitumen is mixed with an organic thermoplastic or elastomeric prior to dispersing the gas in the bitumen.

8. The process according to claim 1, wherein said bitumen has a penetration value of 40-200 dmm, as determined according to ASTM D5 at 25° C.

9. The process according to claim 1, wherein the bitumen foam has a volume ratio of dispersed gas and continuous phase in a range between 1:1 and 1:5.

10. The process according to claim 1, further comprising adding surface active substances to the bitumen prior to or at the same time the gas is brought into contact with the bitumen stream.

11. The process according to claim 10, wherein the surface active substances comprise perfluoralkyl compounds.

12. The process according to claim 1, wherein the gas is brought into contact with the bitumen using a high-shear mixer, emulsifying-mixer or dispersing mixer.

13. The process according to claim 1, wherein the gas is distributed with an average gas bell size of less than 500 μm.

14. The process according to claim 1, wherein the gas is distributed with an average gas bell size of less than 20 μm.

15. The process according to claim 1, wherein the gas has a relative humidity level of less than 90%.

16. The process according to claim 1, wherein the gas dispersed into the bitumen has a temperature higher than 50° C.

17. The process according to claim 1, wherein the bitumen has a viscosity of 200-5,000 mPas measured at said temperature of less than 200° C. using EN 12596.

18. The process according to claim 1, wherein the first gas stream is supplied to the bitumen at an overpressure of 0.1-20 bar.

19. The process according to claim 1, wherein the first gas stream is supplied to the bitumen at an overpressure of 0.5-10 bar.

20. The process according to claim 1, wherein the gas is brought tangentially into contact with a bitumen stream for a contact time of less than 1 second.

* * * * *